(12) United States Patent
McMahon et al.

(10) Patent No.: US 9,004,514 B1
(45) Date of Patent: Apr. 14, 2015

(54) RETRACTABLE BICYCLE FENDER

(71) Applicant: Plume, LLC, Brooklyn, NY (US)

(72) Inventors: William Daniel McMahon, Brooklyn, NY (US); Patrick Alexander Laing, Drayton Park (GB)

(73) Assignee: Plume, LLC, Brooklyn, NY (US)

( * ) Notice: Subject to any disclaimer, the term of this patent is extended or adjusted under 35 U.S.C. 154(b) by 0 days.

(21) Appl. No.: 14/022,408

(22) Filed: Sep. 10, 2013

Related U.S. Application Data

(60) Provisional application No. 61/703,291, filed on Sep. 20, 2012.

(51) Int. Cl.
*B62D 25/18* (2006.01)
*B62J 15/00* (2006.01)

(52) U.S. Cl.
CPC ...................................... *B62J 15/00* (2013.01)

(58) Field of Classification Search
CPC ............. B62J 15/00; B62J 17/00; B62J 27/00
USPC .......................... 280/152.1, 152.2, 152.3, 852
See application file for complete search history.

(56) References Cited

U.S. PATENT DOCUMENTS

| | | | | |
|---|---|---|---|---|
| 5,121,935 A | * | 6/1992 | Mathieu et al. | 280/152.3 |
| 5,562,296 A | * | 10/1996 | Hall et al. | 280/152.3 |
| 5,700,022 A | * | 12/1997 | Finnson | 280/152.3 |
| 6,199,883 B1 | * | 3/2001 | Gable | 280/152.1 |
| 6,367,832 B1 | * | 4/2002 | Vogel | 280/152.1 |
| 7,347,019 B1 | | 3/2008 | Shaw | |
| 7,431,316 B2 | * | 10/2008 | Chuang | 280/152.3 |
| 7,997,601 B2 | * | 8/2011 | Lin | 280/152.3 |
| 8,191,912 B2 | * | 6/2012 | Serbinski | 280/152.1 |

FOREIGN PATENT DOCUMENTS

| | | |
|---|---|---|
| CN | 201472531 U | 5/2010 |
| CN | 101898597 A | 12/2010 |

OTHER PUBLICATIONS

Chari & Co., Kashimax-Rain Tail Vintage Fender Gray, Aug. 24, 2012.
Chunyuan Chen, English Abstract for CN 101898597 A, Bicycle fender and bicyle provided with same, Oct. 9, 2014.
Chunyuan Chen, English Abstract for CN 201472531 U, Vehicle mudguard and bicyle with same, Oct. 9, 2014.
British Library Search, pp. 1-118, Apr. 1, 2011.
British Library Search, pp. 119-237, Apr. 1, 2011.
British Library Search, pp. 238-355, Apr. 1, 2011.
British Library Search, Mar. 29, 2011.
British Library Search, Apr. 1, 2011.

* cited by examiner

*Primary Examiner* — Hau Phan
(74) *Attorney, Agent, or Firm* — Mark Nowotarski

(57) ABSTRACT

A retractable bicycle fender has a bistable Spring strip with an elastomeric grommet at the end. A hole goes through the grommet and the Spring strip to allow mounting on a bicycle seat post. Plastic wings coat the edges of the Spring strip to increase the width of the fender and reduce the noise and rate of recoil. The bicycle fender can be manually extended in wet weather and recoiled in dry weather.

7 Claims, 7 Drawing Sheets

RETRACTABLE BICYCLE FENDER

CROSS REFERENCE TO RELATED APPLICATION

This patent application claims the benefit of US provisional patent application "Retractable Bicycle Fender", by William Daniel McMahon et al, U.S. Ser. No. 61/703,291, filed Sep. 20, 2012. Said application is incorporated herein in its entirety by reference.

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyright rights whatsoever.

FIELD OF THE INVENTION

This invention is in the field of fenders.

BACKGROUND OF THE INVENTION

There is need for a retractable bicycle fender that is stable in its extended configuration and recoils at a modest rate. There is also need for a bicycle fender which is easy to initially install, but difficult to remove by a thief.

SUMMARY OF THE INVENTION

The Summary of the Invention is provided as a guide to understanding the invention. It does not necessarily describe the most generic embodiment of the invention or all species of the invention disclosed herein.

A retractable bicycle fender comprises a bi-stable strip of spring material that is attached to a seat post of a bicycle. The strip is stable in either a coiled configuration or an extended configuration. The strip may be normally coiled in good weather and manually extended in wet weather. The strip of spring material may have a hole in it to accommodate the seat post. The hole may be surrounded by an elastomeric grommet to help it maintain its orientation and allow it to move with road shocks and thus reduce the likelihood of spontaneous coiling when extended. The edge of the strip may be coated with a plastic material to reduce the rate of recoil when the strip is intentionally coiled. This edge coating is referred to herein as a wing. This slower recoil as well as the plastic covered edges will improve the safety of the fender.

DETAILED DESCRIPTION

Figure 1:
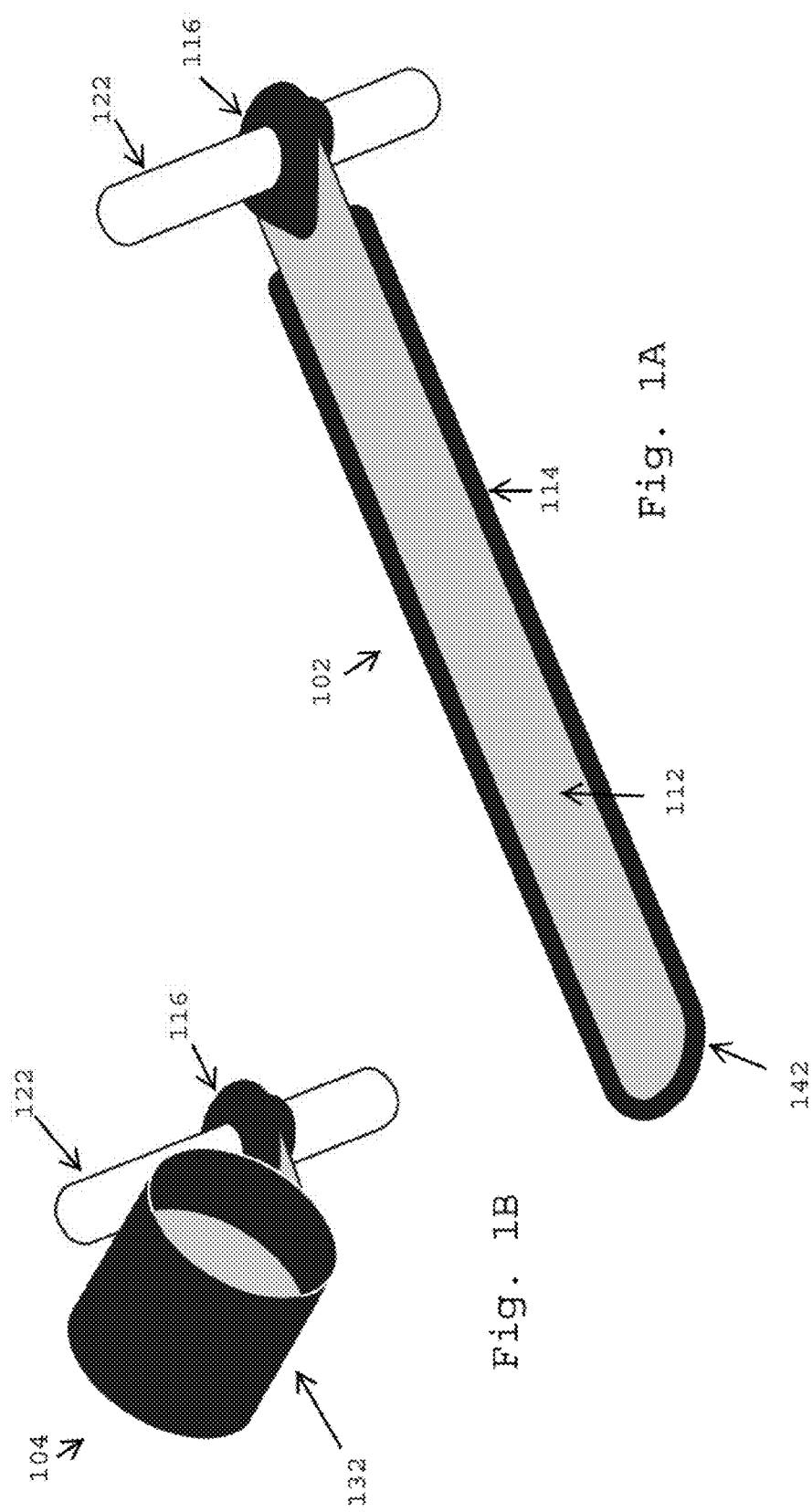
FIG. 1A shows the Retractable Bicycle Fender in an elongated configuration.
FIG. 1B shows the Retractable Bicycle Fender in a coiled configuration.

The detailed description describes non-limiting exemplary embodiments. Any individual features may be combined with other features as required by different applications for at least the benefits described herein. As used herein, the term "about" means plus or minus 10% of a given value unless specifically indicated otherwise.

FIGS. 1A and 1B illustrate a Retractable Bicycle Fender. A Retractable Bicycle Fender is also referred to herein as a "fender", "mudguard", "guard" or the like. FIG. 1A illustrates a Retractable Bicycle Fender 102 when it is elongated. FIG. 1B illustrates a Retractable Bicycle Fender 104 when it is coiled up. A Retractable Bicycle Fender comprises a Spring 112, a Grommet 116, and Wings 114. The Spring is a strip which runs the length of the guard and recoils when not in use. The Grommet holds the mudguard to the bicycle seat post 122. The Wings is a material which runs off the edges of the Spring.

The Spring is the main body of the fender. It may be made from spring stainless steel, or a material capable of delivering similar qualities such as cast, rolled, extruded plastic, or other spring metals such as carbon steel, bronze, etc. The Spring is designed and engineered to be relatively stable in two positions. The first position is elongated (see FIG. 1A). In this position it is functional as a fender and stretches out along the length of the back wheel of the bicycle to catch muddy water picked up and sprayed from wet roads. The second position that this Spring is capable of holding is coiled up 132 into a tight radius which sits next to the seat post in a non-invasive way (see FIG. 1B). The bistable configuration is achieved by the way the Spring is made. Each Spring strip is cut to length and optionally given rounded tips 142 and a hole 402 (FIG. 4) big enough to allow the seat post to fit through it. The Spring is coiled to a tight diameter and cold-rolled to form a cross sectional shape along the length of the strip. The order of these processes may change. This cross sectional shape is designed to hold the strip rigid while elongated when the cross section is raised, but allow the Spring to recoil when it is flattened by a person's hand or other means at the end or a midpoint of its length. FIG. 2 illustrates that the shape of this cross section may vary as different shapes 202, 204, 206, 208, and 210 can serve the same purpose, but the important factor is that the Spring is able to hold its elongated position and resist a certain amount of agitation without recoiling. Additionally, it is important that the Spring be able to be flattened to encourage a recoil without the use of too much force from a person's hand so that it is comfortable and easy to recoil.

Springs may be given their bowed cross sections as illustrated in FIG. 2 either by hot rolling or cold rolling. A suitable hot rolling temperature for stainless steel is 350 C. The hot rolling process may be shielded with an inert or reducing gas, such as nitrogen, hydrogen, argon or mixtures thereof. This will prevent oxidation of the Spring when it is rolled. A surprising advantage of hot rolling is that wings made of TPU (thermoplastic polyurethane) may be heat-bonded to the Springs without causing warping. If a spring is cold rolled, tactile PVC (poly vinyl chloride) may be used for the wing material to reduce the temperature required to bond it to the Spring.

Figure 3:
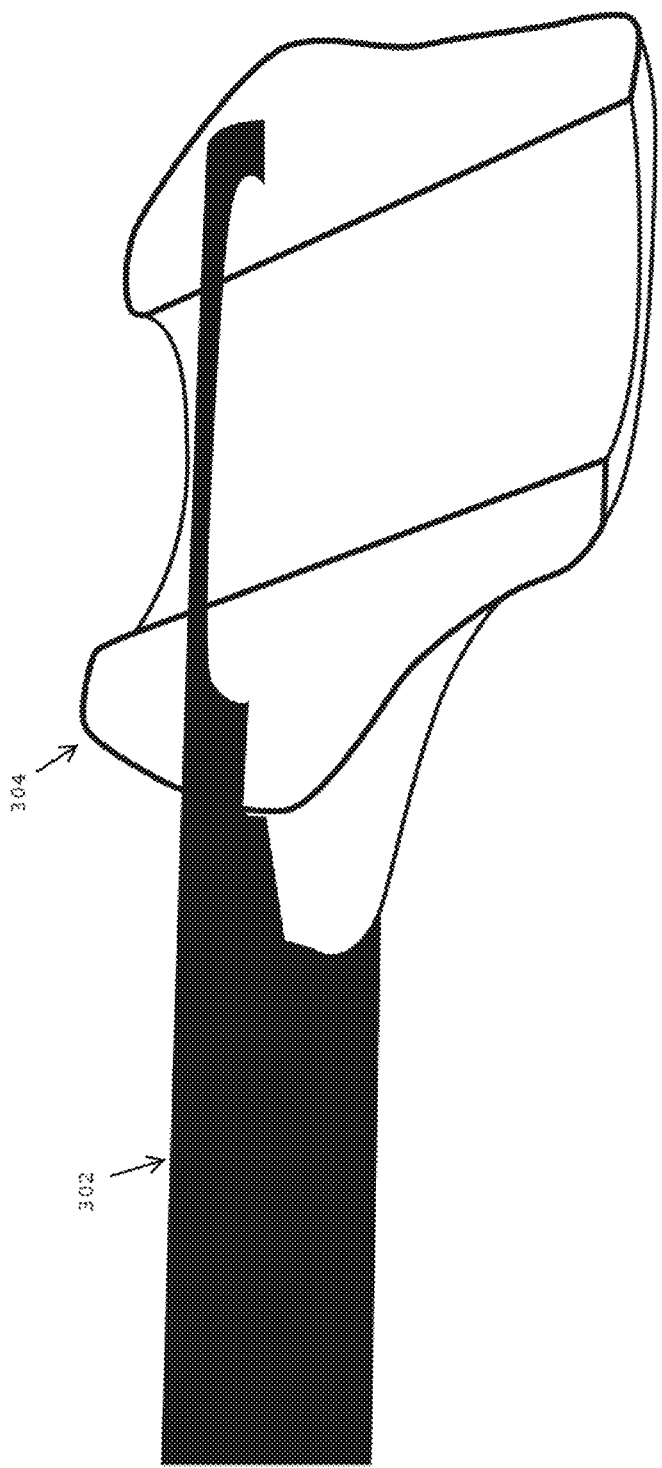
FIG. 3 shows a side view of a longitudinal cut away of an elastomeric grommet in a twin peak configuration.

FIG. 3 shows a cut away view of the end of a Spring 302 embedded in a Grommet 304. Half of the Grommet is shown. The Spring is in its elongated configuration.

Figure 4:
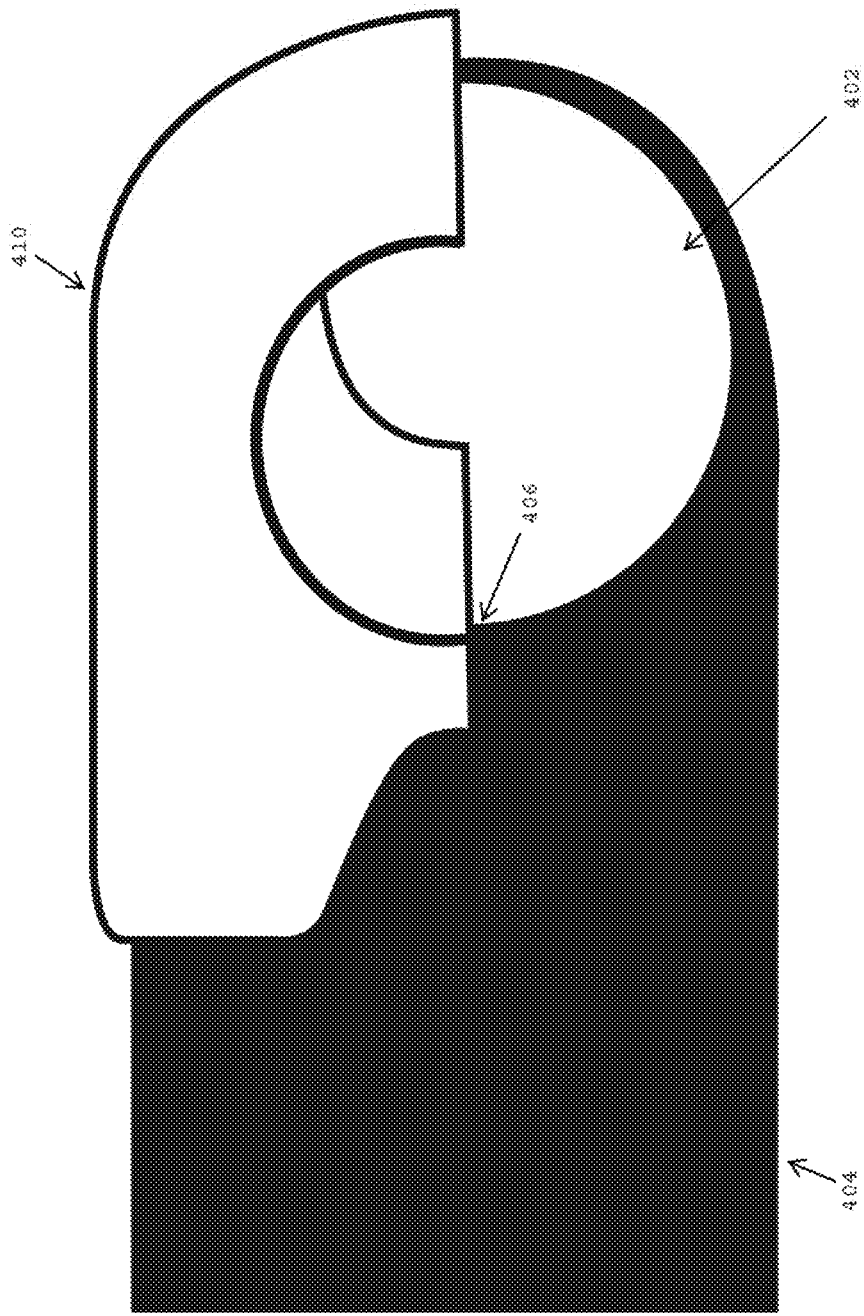
FIG. 4 shows a top view of a longitudinal cut away of an elastomeric grommet in a twin peak configuration.

FIG. 4 illustrates a top cut away view of an elastomeric Grommet 410 bonded to the end of the Spring 404 at the seat post hole 402. One half of the Grommet is shown. There is a hole 402 punched out of one end of the strip 404 which allows the seat post to slide through (and subsequently the Grommet, see below). This hole locates and bonds the Grommet to the Spring. The hole also deters theft of the fender/mudguard because it means that the material of the Spring fully surrounds the seat post without any joins or breaks (see FIGS. 3 and 4). Once installed, stealing the fender would require either removing the entire seat post, or cutting through the Grommet and Spring to remove the fender. Cutting through the Spring and Grommet would render the fender useless. This theft deterrent feature is optional, as the fender could still function as a removable, compact, and portable design.

The hole mentioned above breaks the surface strength of the Spring and creates a weak point at the peak or vertex of the hole 406, compromising the stability of the Spring in its elongated position. Therefore, a kink 602 (FIG. 6) may be placed just after the hole to isolate it from the rest of the Spring. This kink can be created in many ways. These include, but are not limited to:

Rolling the Spring in a direction opposite to its recoil on a tight diameter;
Bending it over an edge;
Coming down on it with a tool; or
Crimping the cross section temporarily in that particular location.

The kink also behaves as a hinge with some flexibility and provides some shock absorption so that the Spring will not spontaneously recoil when the bike rider hits a bump in the road.

The Grommet is a component which holds the fender to the bicycle seat post. It can be made from a thermoplastic polymer, rubber, or other elastomeric material with a suitable shore A hardness of about 50. A shore A hardness of about 50 allows the Grommet to absorb shock from riding over bumps and helps to keep the Spring component from recoiling unexpectedly. Higher shore A hardness may be used for a stiffer Grommet. This might be appropriate for a road bicycle. Lower shore A hardness may be used for a softer Grommet. This might be appropriate for a stunt bicycle.

Figure 5:
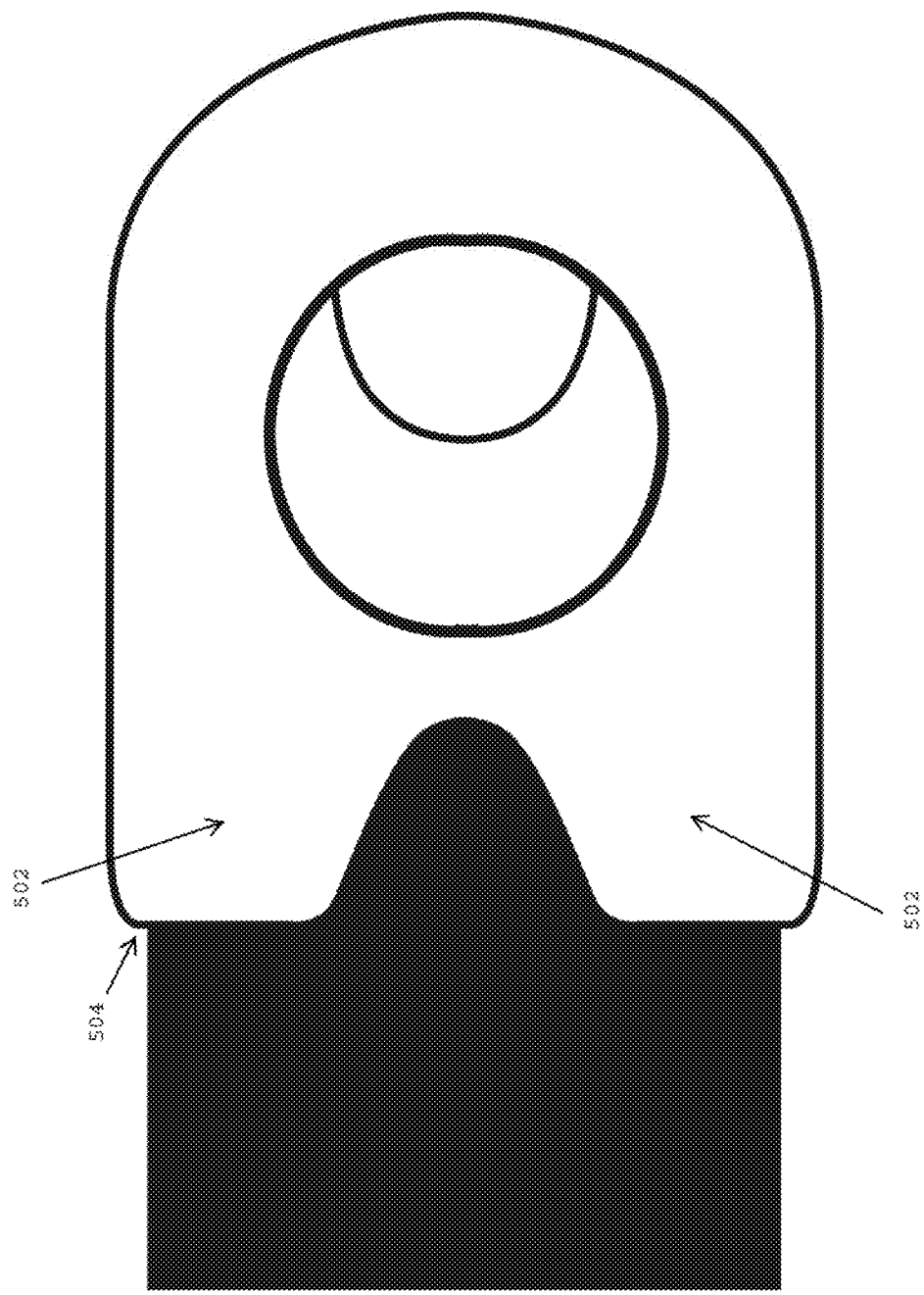
FIG. 5 shows a top view of an elastomeric grommet in a twin peak configuration.

Another aspect to the Grommet which further reduces unexpected recoiling of the Spring is the form of the Grommet itself, such as a "twin peak" design (see FIG. 5). "Twin peaks" refer to the extensions 502 of the Grommet material along the outer edges of the Spring. During moments of vibration, such as when going over a bump, the Spring bounces up and down. The twin peaks 502 apply forces to the edges of the Spring, rather than the center. If forces where applied to the center, that might cause the Spring to flatten and then recoil. The range of motion in the Spring is much greater above its resting position due to the wheel below it. The twin peak design strongly enforces the cross section of the Spring.

The twin peak design maintains a mechanical bond to the steel by flowing off of the edges of the strip 504 (see FIG. 5). This mechanical bond on the edge of the Spring is advantageous. A primer may be applied to the Spring material so that the elastomeric Grommet material will adhere to it without the need to have the material overflow the edges of the strip.

Figure 6:
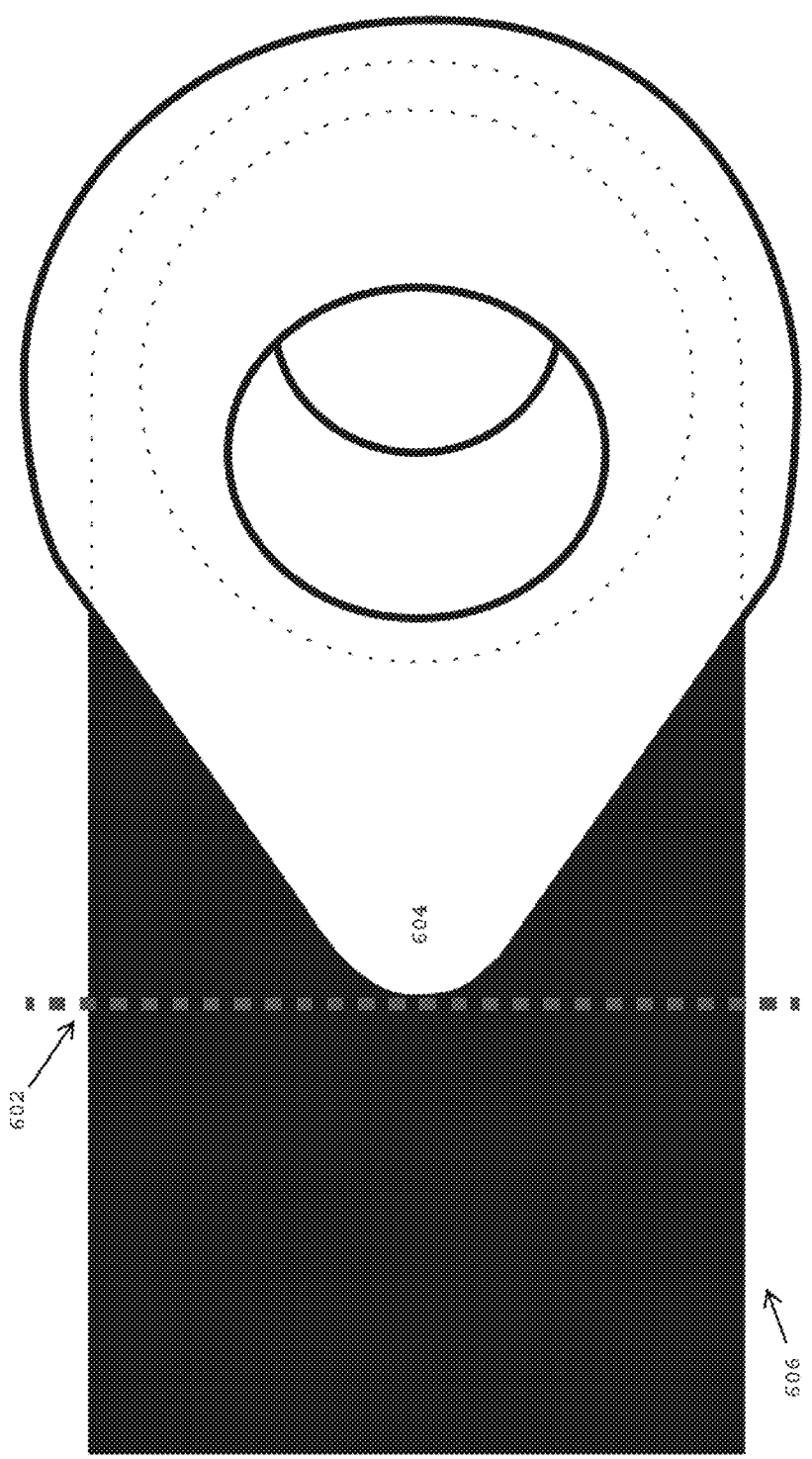
FIG. 6 shows a top view of an elastomeric grommet in a single peak configuration.

FIG. 6 illustrates an alternative "single peak" design. The single peak 604 of Grommet material extends down the center of the Spring 606. This design has a more aerodynamic shape than the twin peak design.

Figure 7:
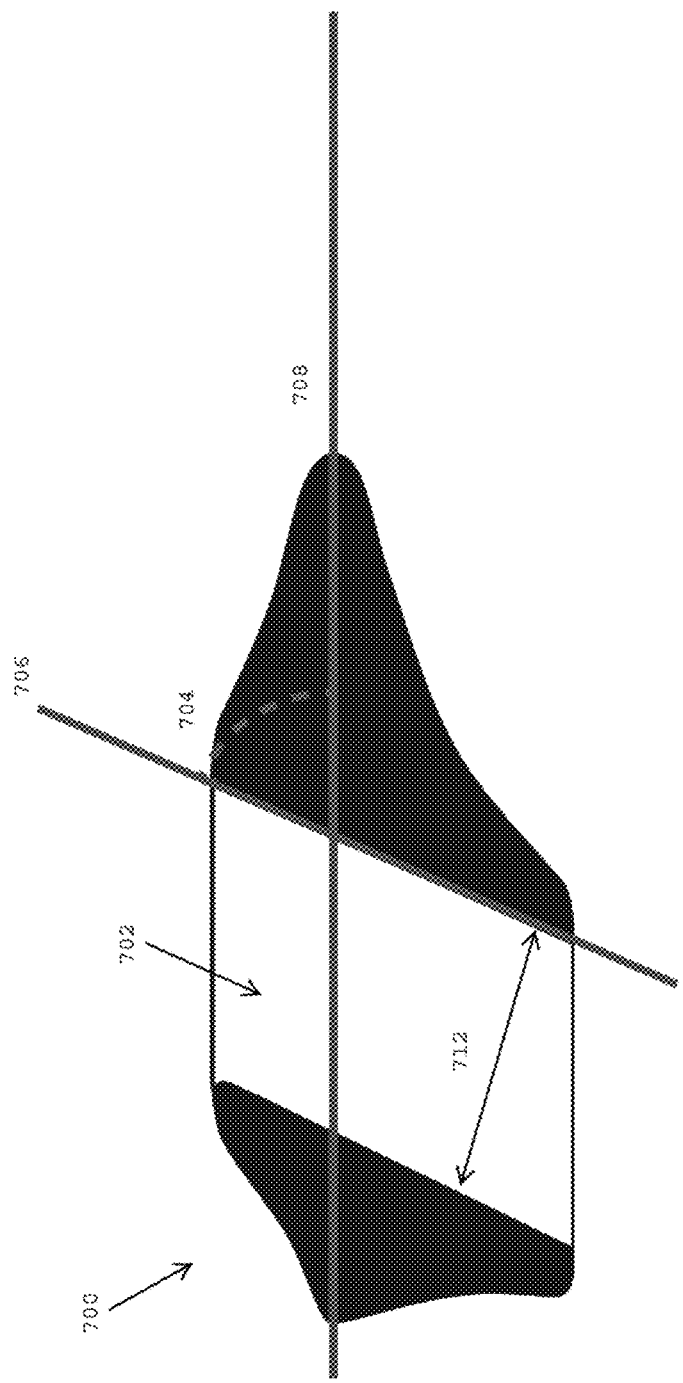
FIG. 7 shows a side view of a longitudinal cross section of grommet in a single peak configuration.

FIG. 7 illustrates a cross section of a Grommet 700. The form of the Grommet may vary but several key aspects remain the same. The Grommet has a hole 702 to allow the seat post to slide through it. The angle 704 between the wall of the hole 706 and the plane of the Spring 708 dictates the angle that the Spring will be suspended from the seat post when it is extended. Therefore this angle, while able to fluctuate to some extent, must remain fairly consistent. The angle chosen must take into account the varying geometries of different bicycle frames and the effect of the weight of gravity on the strip combined with the flex of the Grommet. An angle of about 30 degrees is suitable. Angles in the range of 20 to 40 degrees are suitable. Decreasing the angle to approximately 20 degrees will provide a fender with a sharper raised appearance. Using an angle of 40 degrees would give a more horizontal appearance. Too large of an angle, however, would increase the incidence of the fender striking the bicycle wheel when the bicycle goes over a bump. This can cause unintended recoil of the Spring.

The Grommet is designed to slide onto the seat post. A tool may be needed for removing the seat post. Installation, therefore, is drastically easier than many existing mudguards/fenders. Once the seat post has been removed from the bike, the Grommet can slide onto the seat post and hold a grip due to the diameter 712 of the hole in the Grommet. The Grommet diameter is smaller than standard seat post diameters, but large enough to allow the material to stretch and hold a grip. Common seat post diameters for which the Grommet is compatible range from approximately 25 mm to 28 mm. 27.2 mm seat post diameter is typical. A suitable range of diameters of the hole in a Grommet for standard seat posts is between 20 mm to 22 mm. To fit oversized seat post diameters (anything over 27.4 mm is considered oversized), the Grommet can be fabricated with a larger hole diameter such as 26 mm. Altering material compositions, wall thicknesses, and hole diameters for the Grommet will produce various results. A hole with a diameter in the range of 20 to 22 mm, for example, may fit a seat post of 32 mm if the hole is prestretched.

The soft Grommet design, and the way in which it connects with the Spring, is suitable because of the resilience, strength and flexibility it gives to the connection between the fender and the seat post. This connection is often the first point of failure in conventional plastic mudguards as they are likely to snap.

Figure 2:
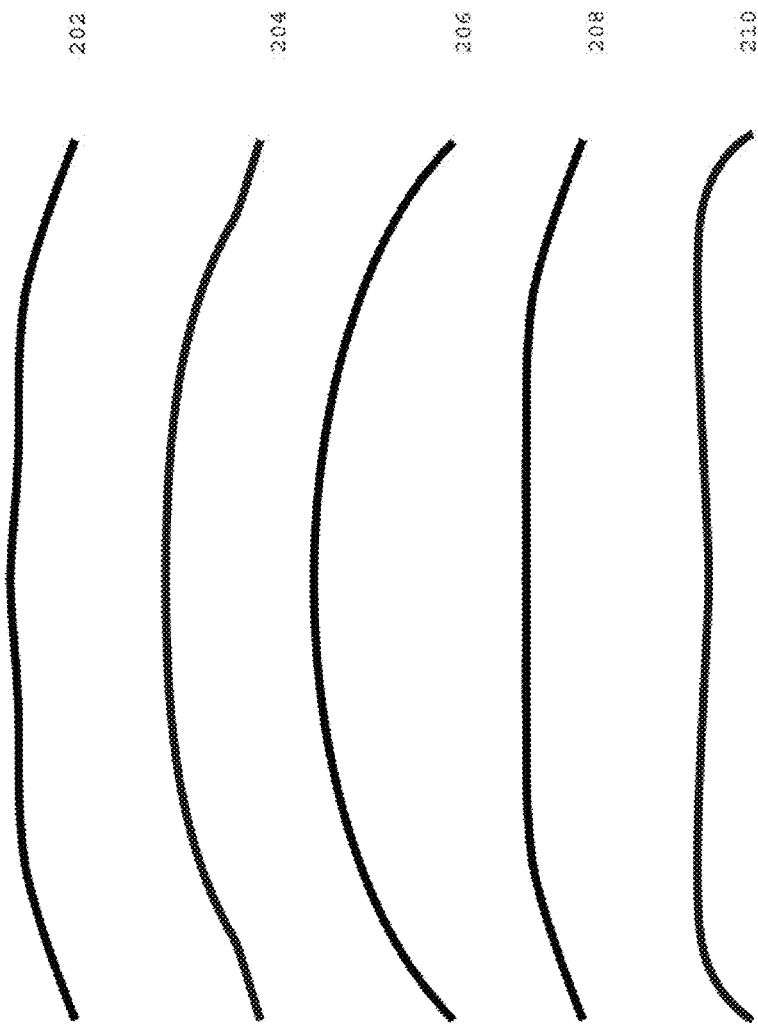
FIG. 2 shows possible cross sections of strips of spring material.

Running off the edges of the Spring are the Wings 114 (see FIG. 1). The Wings serve several functions. They expand the surface area of the mudguard beyond the edges of the Spring to provide a larger catch of water/mud from a bicycle wheel. This is useful when the Spring is made from materials which come in standard widths, such as sprung stainless steel, and the desired total width of the fender is between said standard widths. The Wings also protect the cyclist from the potentially sharp edges of the Spring component. Furthermore, the Wings dampen the speed and noise of the Spring's recoil which would otherwise be an unsettling experience for the user. This dampening does not affect the strength or stability of the Spring in its elongated position.

The protection from potentially sharp Spring edges, and the dampening of the recoil of the Spring, are all positive features provided by the Wings. However, the fender can still function as a more simple, streamlined version without the Wing component.

The Wings can be fabricated/assembled in a large variety of ways. Whatever the material, a certain degree of mechanical flexibility is required to allow the Wings to comfortably stretch to the recoiled position and back to the elongated position without showing signs of stress such as stretch marks or wrinkles. A sheet material in conjunction with a double-sided tape or liquid adhesive may be used. Another method of creating the Wing is to use a spray-on plastic compound material such as Tuffshield™. Tuffshield is flexible and would adhere to the Spring component through the use of a primer and/or etching process to roughen the surface of the Spring. Further possible methods of creating the Wing component could be by using a thermoplastic film or sheet material such as Tuftane™ thermoplastic polyurethane in conjunction with a heated metal tool, heated rollers, or an oven with a method of applying pressure, such as vacuum sealed bags, to bond the material to the Spring. Processes such as injection molding, dip coating/molding, or coating by hand, etc. are also suitable methods for creating the Wings.

A further method of achieving the functionality of the Wing would be to use a process such as powder coating. Advantages of this method include the potential for a more streamlined design and color options.

ALTERNATIVE EMBODIMENTS

The embodiments described herein are meant to be exemplary and not limiting. Obvious variations available to a person of ordinary skill in the art are considered disclosed herein. The dimensions of the fenders, for example, can be adjusted according to the size of a bicycle. The fender may be applied to front wheel as well as a back wheel. The fender may be applied to other wheeled vehicles, such as motorbikes, carts, unicycles, tricycles, recumbent bicycles, etc. The shape of the Grommet may be varied to have about the same height to width ratio as illustrated in FIG. 7. The Grommet, for example, may be cubic, ellipsoidal, conical or other shape that provides similar mechanical support to the Spring.

We claim:
1. A retractable bicycle fender comprising:
   a) a spring strip; and
   b) an elastomeric grommet
wherein:
   c) said spring strip has a stable elongated configuration that forms said fender and a stable coiled configuration;
   d) said spring strip forms a seat post hole without a break, said seat post hole having a diameter larger than the diameter of a bicycle seat post;
   e) said elastomeric grommet is attached to said spring strip and surrounds said seat post hole forming a grommet hole with a wall; and
   f) the diameter of said grommet hole is less than the diameter of said bicycle seat post such that said grommet will grip said bicycle seat post when said bicycle seat post is inserted through said grommet hole.

2. The bicycle fender of claim 1 which further comprises plastic wings wherein said plastic wings extend along each long edge of said spring strip.

3. The bicycle fender of claim 2 wherein said plastic wings increase the width of said bicycle fender to more than the width of said spring strip.

4. The bicycle fender of claim 1 wherein said wall of said grommet hole is at an angle with respect to the plane of said spring strip, said angle being in the range of 20 to 40 degrees.

5. The bicycle fender of claim 4 wherein said angle is about 30 degrees.

6. The bicycle fender of claim 1 wherein twin peaks of said elastomeric grommet are extended along the edges of said spring strip.

7. The bicycle fender of claim 1 wherein the diameter of said grommet hole is in the range of 20 mm to 26 mm.

* * * * *